United States Patent
von Praun et al.

(10) Patent No.: US 7,890,725 B2
(45) Date of Patent: Feb. 15, 2011

(54) BUFFERLESS TRANSACTIONAL MEMORY WITH RUNAHEAD EXECUTION

(75) Inventors: Christoph von Praun, Briarcliff Manor, NY (US); Xiaotong Zhuang, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 11/775,126

(22) Filed: Jul. 9, 2007

(65) Prior Publication Data

US 2009/0019247 A1  Jan. 15, 2009

(51) Int. Cl.
*G06F 12/14* (2006.01)
(52) U.S. Cl. .................. 711/163; 711/146; 711/154; 711/E12.098
(58) Field of Classification Search ........... 711/E12.098
See application file for complete search history.

(56) References Cited

U.S. PATENT DOCUMENTS

| | | | |
|---|---|---|---|
| 5,412,788 A | 5/1995 | Collins et al. | |
| 5,490,113 A | 2/1996 | Tatosian et al. | |
| 5,592,634 A * | 1/1997 | Circello et al. | 711/167 |
| 5,987,552 A | 11/1999 | Chittor et al. | |
| 6,535,869 B1 | 3/2003 | Housel, III | |
| 2002/0083078 A1* | 6/2002 | Pardon et al. | 707/104.1 |
| 2007/0028056 A1* | 2/2007 | Harris | 711/150 |
| 2007/0198792 A1* | 8/2007 | Dice et al. | 711/163 |
| 2008/0065639 A1* | 3/2008 | Choudhary et al. | 707/7 |

OTHER PUBLICATIONS

International Search Report.

* cited by examiner

*Primary Examiner*—Michael C Krofcheck
(74) *Attorney, Agent, or Firm*—F. Chau & Associates LLC

(57) ABSTRACT

A method for executing an atomic transaction includes receiving the atomic transaction at a processor for execution, determining a transactional memory location needed in memory for the atomic transaction, reserving the transactional memory location while all computation and store operations of the atomic transaction are deferred, and performing the computation and store operations, wherein the atomic transaction cannot be aborted after the reservation, and further wherein the store operation is directly committed to the memory without being buffered.

19 Claims, 3 Drawing Sheets

BUFFERLESS TRANSACTIONAL MEMORY WITH RUNAHEAD EXECUTION

BACKGROUND OF THE INVENTION

1. Technical Field

The present invention relates to a system and method for supporting transactional memory.

2. Description of Related Art

Atomic transactions have been widely used in parallel computing and transaction processing. An atomic transaction generally refers to the execution of multiple operations, such that the multiple operations appear to be executed together without any intervening operations. For example, if a memory address is accessed within an atomic transaction, the memory address should not be modified elsewhere until the atomic transaction completes. Thus, if a processor (or a thread in a multithreading environment) uses an atomic transaction to access a set of memory addresses, the atomic transaction semantics should guarantee that another processor (or another thread) cannot modify any of the memory addresses throughout the execution of the atomic transaction.

Atomic transactions can be implemented at architecture level via proper architecture and micro-architecture support, rather than at software level via semaphores and synchronization instructions. Architecture-level atomic transactions can potentially improve overall performance using speculative executions of atomic transactions as well as elimination of semaphore uses. Furthermore, architecture-level atomic transactions can improve productivity because programmers no longer need to worry about using semaphores to achieve desired atomicity semantics.

Supporting atomic transactions architecturally often requires expensive hardware and software enhancements, such as large on-chip buffers for data of uncommitted atomic transactions, and software-managed memory regions for on-chip buffer overflows. Various architecture mechanisms supporting atomic transactions have been proposed. Architecture support of atomic transactions needs to provide conflict detection between atomic transactions, and data buffering for uncommitted atomic transactions. Conflict between different atomic transactions accessing same memory locations is usually detected by hardware on-the-fly. This can be achieved with reasonable implementation cost and complexity because the underlying cache coherence mechanism of the system can be used. However, it can be quite challenging to buffer data for uncommitted transactions with reasonable cost and complexity, if an atomic transaction can modify a large number of memory locations that cannot fit in an on-chip buffer (either a dedicated buffer or on-chip L1/L2 caches).

Existing architecture support of atomic transactions either requires that an atomic transaction ensure buffer overflow cannot happen, or fall back to some software solution when buffer overflow happens. The first approach inevitably limits the use of atomic transactions. The second approach often requires software to acquire some semaphore such as a global lock (that protects the whole address space) to ensure atomicity of memory accesses. It should be noted that when a thread is using a semaphore to protect a memory region, other threads accessing the memory region must use the same semaphore to ensure mutual exclusion. This hardware-software approach of handling buffer overflow is often inefficient and complex.

Therefore, a need exists for a transactional memory system that does not require program transformation and that can handle concurrent execution of transactions of any size without buffering speculative data.

SUMMARY OF THE INVENTION

According to an embodiment of the present disclosure a method for executing an atomic transaction includes receiving the atomic transaction at a processor for execution, determining a transactional memory location needed in memory for the atomic transaction, reserving the transactional memory location while all computation and store operations of the atomic transaction are deferred, and performing the computation and store operations, wherein the atomic transaction cannot be aborted after the reservation, and further wherein the store operation is directly committed to the memory without being buffered.

According to an embodiment of the present disclosure, a method for executing an atomic transaction includes receiving the atomic transaction at a processor for execution, determining a transactional memory location needed in memory for the atomic transaction, acquiring reservations for the transactional memory location to be accessed by at least one of a memory read operation and a memory store operation while deferring all memory store operations until after the reservation of all transactional memory locations, and performing the computation and store operations, wherein the atomic transaction cannot be aborted after a first store on the transactional memory locations, and further wherein the store operation is directly committed to the memory without being buffered.

According to an embodiment of the present disclosure, a system for executing an atomic transaction includes a memory device storing the atomic transaction, and a processor for executing the atomic transaction, the execution comprising receiving the atomic transaction at the processor for execution, determining a transactional memory location needed in the memory device for the atomic transaction, reserving the transactional memory location while all computation and store operations of the atomic transaction are deferred, and performing the computation and store operations, wherein the atomic transaction cannot be aborted after the reservation, and further wherein the store operation is directly committed to the memory device without being buffered.

According to an embodiment of the present disclosure, a method for executing an atomic transaction includes receiving the atomic transaction at a processor for execution, determining a transactional memory location needed in a transaction memory device for the atomic transaction, reserving the transactional memory location while all computation and store operations of the atomic transaction are deferred, and performing the computation and store operations, wherein the atomic transaction cannot be aborted after the reservation, and further wherein the store operation is directly committed to the memory.

BRIEF DESCRIPTIONS OF THE DRAWINGS

Preferred embodiments of the present disclosure will be described below in more detail, with reference to the accompanying drawings.

DETAILED DESCRIPTION OF PREFERRED EMBODIMENTS

According to an embodiment of the present disclosure, architecture support for atomic transactions is called Bufferless Transactional Memory with Runahead Execution (BLT). Architecture support of BLT maintains no buffer space to hold data for uncommitted transactions. BLT executes a transaction in two possibly overlapping phases, the phases including a transaction head and a transaction tail. The transaction can be aborted during the transaction head phase when a conflict is detected with another transaction. Execution of the transaction head phase does not create speculative data and defers the computation and store operations of shared data to the tail phase. If a transaction has entered the transaction tail phase, the transaction cannot be aborted and is guaranteed to complete. As a result, data of memory write operations performed in the transaction tail phase can be directed committed to the memory without being temporarily buffered.

In a BLT according to an embodiment of the present disclosure, complex buffer overflow handling and program transformation are eliminated without sacrifice of performance or productivity.

Figure 2:
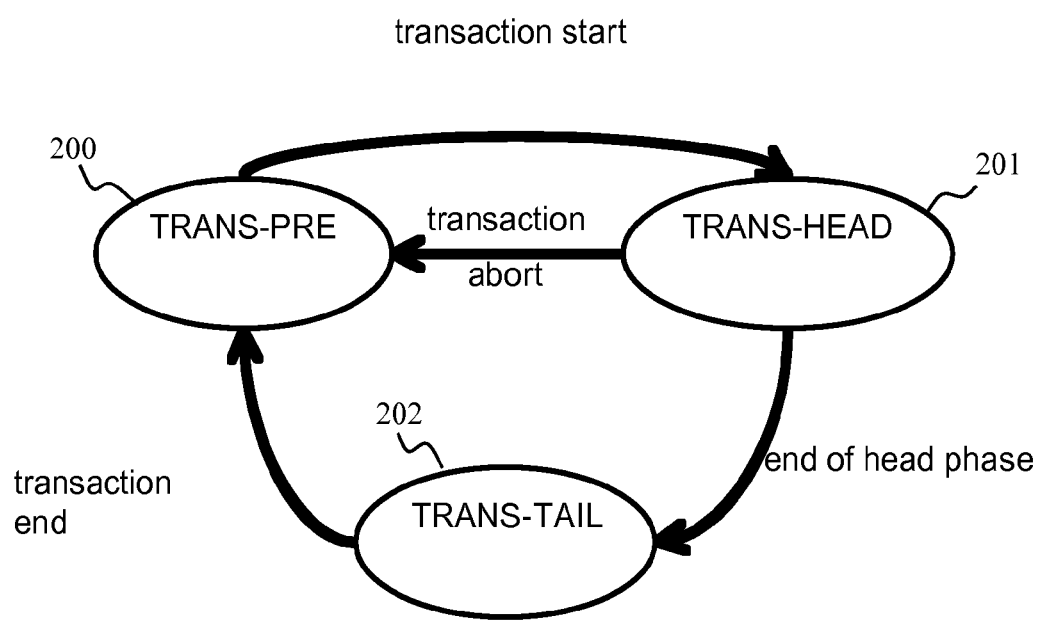
FIG. 2 is a state transition diagram for a BLT according to an embodiment of the present disclosure.

Referring to the state transition diagram is shown in FIG. 2, a processor is initially in the TRAN-PRE state 200. When the processor starts a transaction, it transits to the TRAN-HEAD state 201 and execution continues at a transaction start. When a transaction end operation is encountered in the TRAN-HEAD state 201, the reservation phase of the transaction is complete. The processor transits to state TRANS-TAIL 202 and execution continues at the transaction start.

Figure 3:
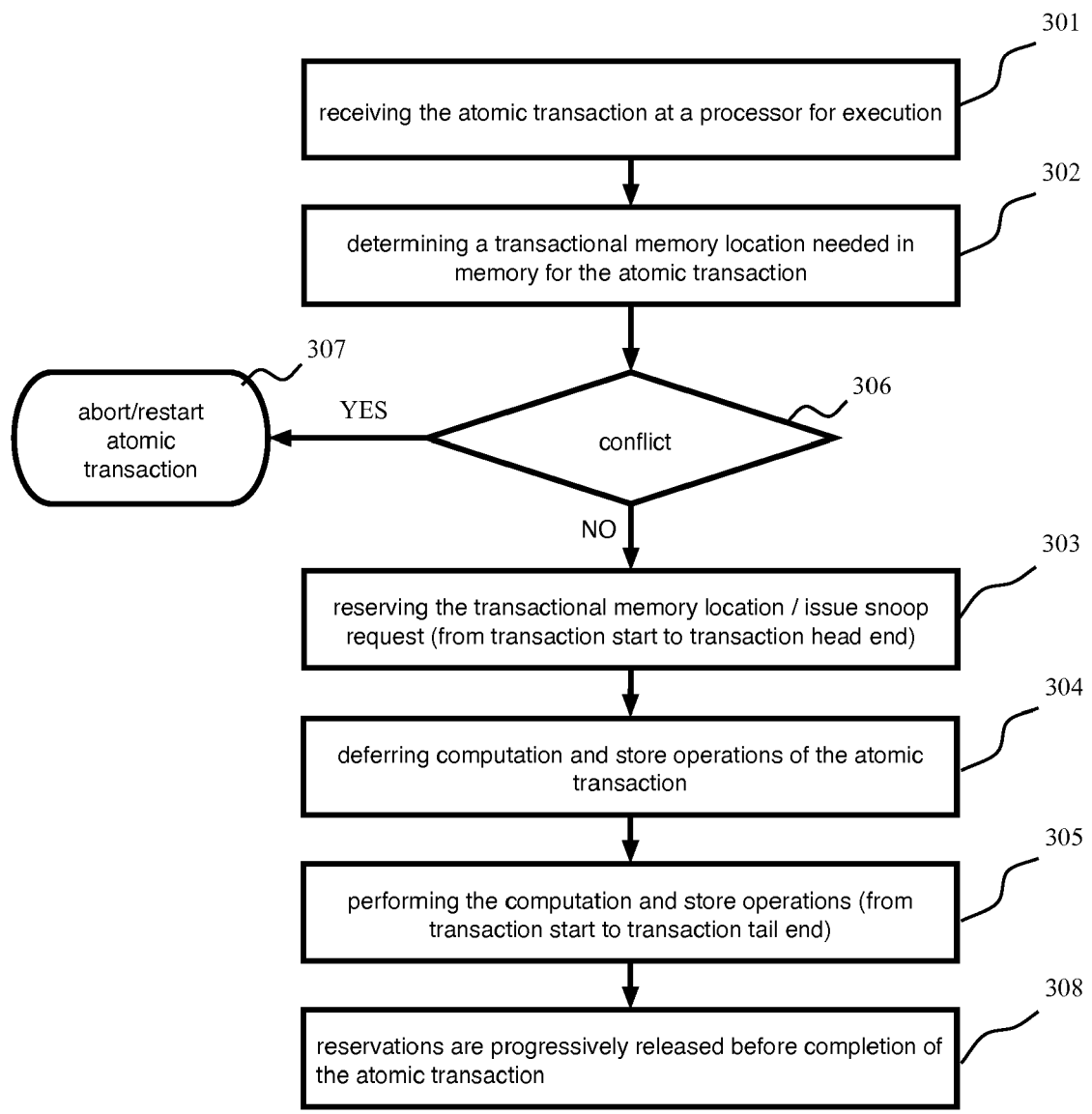
FIG. 3 is a flow chart of a method executing an atomic transaction in a head and tail phase according to an embodiment of the present disclosure.

Referring to FIG. 3, according to an embodiment of the present disclosure, an atomic transaction is received by a processor 301 the transaction including two phases, transaction head and transaction tail. The execution of the head phase includes the determination of locations that a transaction possibly reads or writes 302 and establishes appropriate reservations 303. Computation of values during the tail phase of the transaction is only performed as far as values are needed 304/305. The tail phase performs computation of values and stores the values into memory.

According to an embodiment of the present disclosure, memory reservation may be used during execution of the head phase. During the transaction head phase, the transaction executes one or more memory reserve operations to reserve transactional memory locations that are accessed in the transaction (res_w). An optimization allows the transaction to execute a memory-reserve-for-load (res_r) operation to reserve one or more transactional memory locations for load operations, wherein the reserved memory locations will only be accessed by memory read operations in the transaction. No memory write operation to a transactional memory location is allowed in the transaction head phase. Thus, if the transaction in the transaction head phase is aborted, memory locations modified in the transaction are not recovered. Semantically, a memory reserve operation ensures that a transactional memory address is reserved so that, once the transaction completes the reservation phase, it cannot be aborted due to a data race on that transactional memory location, allowing memory write operations to be directly committed to the memory without being buffered.

In order to effectively support atomic transactions, two capabilities are needed from a transactional memory system (implemented as hardware and/or software), including the abilities to keep uncommitted data generated by an atomic transaction and to detect conflicts (e.g., atomicity violations) between atomic transactions 306.

BLT does not require any data to be buffered during either head and tail phases. Detecting conflicts is easier to implement in hardware because the detection can build upon pre-existing mechanisms, such as a pre-existing cache coherence mechanism.

The programming model exposed to the programmer provides primitives, a first to start and a second to conclude an atomic transaction. BLT specifies that an atomic transaction reserve every memory location the atomic transaction intends to read or modify before the atomic transaction issues any store to transactional addresses. Transactional addresses are addresses guaranteed to maintain the last value they recorded before an atomic transaction started if that atomic transaction is aborted, allowing all memory locations accessed by a given atomic transaction to be reserved in advance, which guarantees the given atomic transaction's completion if a store from that given transaction is executed. If reservation of any of the addresses cannot be guaranteed by the BLT system, the given atomic transaction is aborted 307 and no store to transactional memory is ever executed.

Hereinafter, atomic transactions are simply called transactions for conciseness.

According to an embodiment of the present disclosure, execution of the head and tail phase may be performed without using temporary storage for speculative data. Regarding the tail phase: Since execution is not speculative, memory write operations need not be buffered and can be directly effected on the memory. Regarding the head phase: The behavior of memory read, memory write, arithmetic, and conditional branch operations is altered during the execution of this phase as follows:

Memory write operations do not alter storage but are implicitly recorded and implicitly obtain a reservation of the read location as does said operation res-w.

Figure 4:
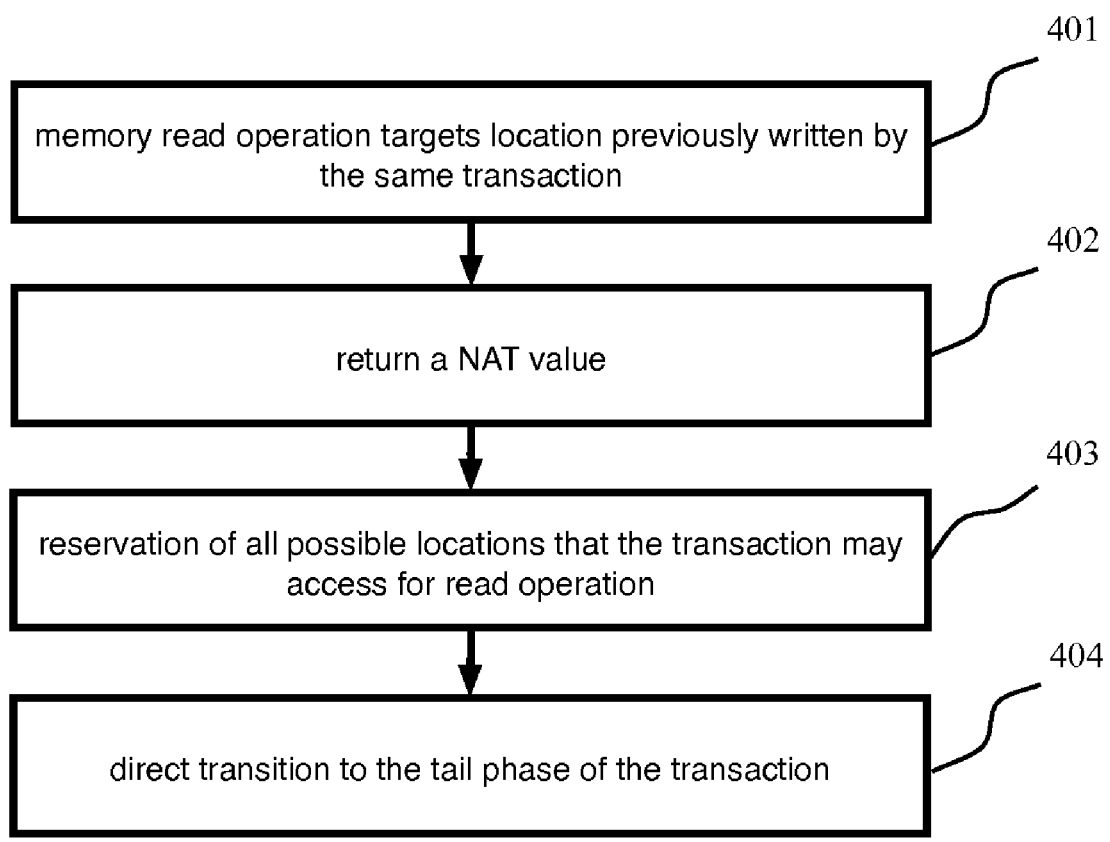
FIG. 4 is a flow chart of a method in which a memory read operation targets a location that was previously written by the same transaction according to an embodiment of the present disclosure.

Memory read operations have regular semantics for locations that have not been the target of a write operation in the same transaction. A memory read operation implicitly obtains a reservation of the read location as does said operation res_r. Referring to FIG. 4, if a memory read operation targets a location that was previously written by the same transaction 401, a "not a thing value" (NAT value) is returned 402.

Arithmetic operations are compatible with NAT values, that is, the result of said operation, if dependent on an argument with NAT value, is NAT.

Memory read operations for which the target address evaluates to NAT cause a reservation of all possible locations that the transaction may access 403 and a direct transition to the tail phase of the transaction 404.

Conditional branches for which the condition evaluates to a NAT value cause a reservation of all possible locations that the transaction may access and a direct transition to the tail phase of the transaction. Alternatively, a superset of accessed location can be reserved by executing the head phase along both directions of said conditional branch. This scheme is meaningful if both execution paths merge shortly after the branch. However, if the two paths become divergent, where no merge occurs after a certain number of instructions on each path, the paths are not likely to merge. In such case, all possible locations that the transaction may access are reserved and a direct transition to the tail phase of the transaction occurs.

The set of all possible locations that a transaction may access can be approximated conservatively by a program analysis and encompasses—in the worst case—the entire memory accessible by the program.

The technique of altering the semantics of memory access operation, arithmetic operations, and conditional branch instructions as said during the execution of the head phase does not require that the program is transformed.

According to an embodiment of the present disclosure, execution of the head and tail phases may overlap. The tail phase can start execution at the same time as the head phase. The behavior of memory read, memory write operations is altered as follows during the tail phase:

Memory read operations stall as long as execution of the head phase has not progressed to a point where it acquired the reservation for this location 306.

Memory write operations stall until the execution of the head phase completes 306.

The execution of the tail phase is restarted when the execution of the head phase restarts, e.g., due to the occurrence of a reservation miss 307.

According to an embodiment of the present disclosure, during the computation of the tail phase reservations may be progressively released 308. This is an optimization of the execution that can increase concurrency among transactions since it shortens the time during which individual threads hold data reservation.

This optimization is based on the following observation:

Once the tail phase of a transaction has executed its last access of a certain memory location within the current transaction, the reservation of this memory location can be released. This allows other transactions to acquire the access privilege for this location and to proceed simultaneously to the transactions that previously held the reservation.

Information about the occurrence of a 'last access' to a certain memory location (data address and program counter) can be learned during the execution of the head phase. For each memory access, the head phase records in the Memory Access History Table (MAHT). This table is local to the current transaction and only serves to support the early release optimization. The MAHT maps a data address to a program counter. Should table already contain an entry with the same data address, the program counter in the entry is updated. Should the program counter be the same, then this location is not amenable to the early release optimization and the entry in the MAHT is changed to record that fact. The entries in the MAHT tables are marked as 'valid' when execution of the head phase is complete.

When the tail phase executes a memory access operation and finds a valid entry corresponding to the program counter and data address in the MAHT map, then this entry in the map can be cleared and the reservation for this location can be released.

The early release optimization and its implementation mechanism are valid irrespective of whether the head and tail phase execute in sequence or concurrently. The Optimization is only effective after the head phase terminates.

According to an embodiment of the present disclosure, micro-architecture support is provided for BLT. A hash-table implementation may be used for address reservation tables. Snoops of address reservation tables can be seamlessly integrated with the underlying cache coherence mechanism. The implementation technique is applicable to any of a variety of coherence protocols, such as the protocol found in the IBN® Power4 systems and directory-based protocols found in large-scale shared-memory systems.

When a transaction (running in a thread) performs a memory-reserve instruction to reserve a memory address, the memory address is recorded in the corresponding address reservation table. Meanwhile, a reservation-snoop request is sent to all other processors so that their address reservation tables can be checked. The processor that issues the reservation-snoop request is referred to as the requesting processor, and the processors that receive the reservation-snoop request are referred to as the snooping processors.

When a snooping processor receives a reservation-snoop request, the snooping processor checks its own address reservation tables to determine if the memory address is reserved at the snooping processor. If the memory address is found, a conflict is detected between a transaction on the requesting processor and a transaction on the snooping processor. There are two possible scenarios. If the transaction on the snooping processor is in the transaction tail phase (and thus cannot be aborted), the snooping processor sends an abort signal in its snoop response to the requesting processor so that the transaction on the requesting processor will be aborted. If the transaction on the snooping processor is in the transaction head phase (and thus can be aborted), the snooping processor either aborts its own transaction, or sends an abort signal to the requesting processor to abort the transaction on the requesting processor. An appropriate fairness policy can be employed to determine which of the two transactions should be aborted. When a transaction is aborted, all memory addresses in the corresponding address reservation table are cleared.

It should be noted that reservation-snoop messages and operations can be implemented as enhancement of the underlying cache coherence mechanism. A reservation-snoop request can often be piggybacked to a cache coherence request.

In order to record information about addresses currently reserved by a transaction running on a processor, one read address reservation table (RART) and one write address reservation table (WART) per transaction can be used. Each address reservation table (ART) records every physical address reserved by a given transaction (recording physical addresses in an ART is preferred to avoid page aliasing issues). Notice that an ART can store the exact set of reserved addresses with a one-to-one mapping between addresses and entries, but in this case there may be more addresses to be stored than entries to store them and the table storage space might not be sufficient. Alternatively, an ART can store a superset of the reserved addresses. Due to the superset encoding, all reserved addresses can always be encoded in the structure, but a group of addresses may be mapped into the same ART entry. The mapping of multiple addresses to the same ART entry may cause performance degradation due to the increased possibility of conflicts between transactions (a transaction may reserve more addresses than the transaction actually needs), but correctness is preserved. It is worth pointing out that removal of individual addresses is not necessary. Elements only have to be removed from the ART on transaction abort or commit, at which point the whole ART can be cleared.

For example, ARTs can be implemented as Bloom filter structures. When an address is added to a Bloom filter structure, a number of hash functions are computed from the address to be inserted. Each of the hash functions generates a bit pattern that is used to index an array of bits. Each indexed bit is then set (these bits are initially reset). Because of the hash-based encoding, a Bloom filter effectively encodes a superset of all reserved addresses. In a simple Bloom filter, individual removal of elements is not trivial. However, this is not a problem because no individual element removal is necessary in an ART, as pointed out in the above paragraph. When an ART needs to be cleared, it is sufficient to simply reset all of the bits in the Bloom filter array.

An exemplary address reservation table is an n-bit vector, with k (0<k<n) predefined hash functions. Each hash function maps a memory address to an index to the n-bit vector. Initially each bit in the n-bit vector is cleared to be 0. To record a memory address in the address reservation table, the processor sets all the k corresponding bits in the n-bit vector (according to the k hash functions) to be 1. To check whether a memory address is recorded in the address reservation table, the processor checks all the k corresponding bits in the n-bit vector (according to the k hash functions): the memory address is found only if all the k corresponding bits have been set to 1.

It should be appreciated that the hash table implementation described above allows address reservation information to be recorded with reasonable implementation cost. For example, a 128B hash table comprises 1024 bits that can be indexed by the hash functions. If all the bits in the hash table have been set to 1, it means that the whole address space for transactional memory locations is reserved for the transaction.

The read and write ARTs can be implemented as a unified ART. The problem caused by the use of a UART happens when more than one transaction read from a transactional address, but none of them actually writes to this transactional address. Because all reserved addresses of a transaction are recorded in a single ART when a UART is used, it is impossible to tell whether an address has been inserted in the UART by a read reservation or a write reservation. Therefore, it is impossible to determine whether the two conflicting accesses were both reads, and one of the transactions has to be conservatively aborted.

In order to record a processor state regarding transactions, a simple state machine can be used. Three states are needed to express possible operation modes: not in transaction (TRAN-PRE), in transaction with reservations allowed (TRAN-HEAD) and in transaction with reservations not allowed (TRAN-TAIL). If a processor is in state TRAN-PRE, the processor is not executing a transaction. If a processor is in state TRAN-HEAD, the processor is executing the head phase of a transaction. If a processor is in state TRAN-TAIL, the processor is executing the tail phase of a transaction.

Referring to the state transition diagram is shown in FIG. 2, a processor is initially in the TRAN-PRE state 200. When the processor starts a transaction, it transits to the TRAN-HEAD state 201 and execution continues at a transaction start. When a transaction end operation is encountered in the TRAN-HEAD state 201, the reservation phase of the transaction is complete. The processor transits to state TRANS-TAIL 202 and execution continues again at the transaction start. When a transaction end operation is encountered in the TRAN-TAIL state, the processor releases the reservations of this transaction, transits to the TRAN-PRE state 200, and continues execution beyond the transaction end.

Table 1 shows in detail which actions need to be taken on each event triggered by the BLT mechanism, for each of the possible processor states.

TABLE 1 detail of the state transitions illustrated in FIG. 2.

| event | state | Action |
|---|---|---|
| Transaction start | TRAN-PRE | Allocate read/write ARTs, transition to TRAN-RSV state |
| Read reservation | TRAN-PRE | Undefined |
| Write reservation | TRAN-PRE | Undefined |
| Transaction abort | TRAN-PRE | Undefined |
| Transaction end | TRAN-PRE | Undefined |
| Read reservation request | TRAN-PRE | No action |
| Write reservation request | TRAN-PRE | No action |
| Transaction start | TRAN-HEAD | Undefined |
| Read reservation | TRAN-HEAD | Send read reservation request to other processors |
| Write reservation | TRAN-HEAD | Send write reservation request to other processors |
| Transaction abort | TRAN-HEAD | Deallocate ARTs, transition to TRAN-PRE state Redirect execution to abort handler |
| Transaction end | TRAN-HEAD | Deallocate ARTs, transition to TRAN-PRE state |
| Read reservation request | TRAN-HEAD | Search requested address in write ARTs If the address is in NRT, reserve all and transition to TRAN_TAIL If address not found send acknowledgement to requester, otherwise invoke fairness mechanism to decide which transaction to abort. |
| Write reservation request | TRAN-HEAD | Search requested address in read ARTs If the address is in NRT, reserve all and transition to TRAN_TAIL If address not found send acknowledgement to requester, otherwise invoke fairness mechanism to decide which transaction to abort. |
| Combined acknowledgement response | TRAN-HEAD | Reserve address in corresponding ART |
| Combined abort response | TRAN-HEAD | Transaction abort event |
| Conditional branch with NAT value | TRAN-HEAD | reserve all and transition to TRAN_TAIL |
| Transaction start | TRAN-TAIL | Undefined |
| Read reservation | TRAN-TAIL | Trap |

TABLE 1-continued detail of the state transitions illustrated in FIG. 2.

| event | state | Action |
| --- | --- | --- |
| Write reservation | TRAN-TAIL | Trap |
| Transaction abort | TRAN-TAIL | Undefined |
| Transaction end | TRAN-TAIL | Deallocate ARTs, transition to TRAN-PRE state |
| Read reservation request | TRAN-TAIL | Undefined |
| Write reservation request | TRAN-TAIL | Undefined |
| Combined acknowledgement response | TRAN-TAIL | Trap |
| Combined abort response | TRAN-TAIL | Trap |

The processor states TRAN-HEAD and TRAN-TAIL control the operation of memory read, memory write, arithmetic, and conditional branch instructions. In the TRAN-HEAD state, the behavior is different from the regular operation (in TRAN-TAIL and TRAN-PRE states) as described in a previous paragraph.

The ART structures record reservations implicitly with memory read and memory write operations during the execution of the head phase.

NAT values are automatically generated by the hardware during execution of the head phase. To determine the occurrence of NAT values during the head phase, address information for NAT values is recorded in the NAT Reference Table (NRT). The NRT can be combined with the reservation information kept in the ART structures or it can be stored separately from the reservation information. Also, it can be represented either in a precise or a superset encoding, such as a Bloom filter. Because NAT values only contain one bit information, a superset encoding should occupy a small and fixed amount of space.

Therefore the BLT implementation does not require a buffer space that might overflow in the worst case, neither does it require that the program with transactions is transformed before execution.

Context switches during the execution of transactions (TRAN-HEAD or TRAN-TAIL states) can be handled using two different approaches. The first approach is to abort a transaction whenever the context needs to be switched, but this approach may prevent long transactions to complete. An alternative is to switch out the program while running a transaction, saving its context and locking the ARTs allocated for that transaction such that, while the transaction is not being executed (switched out), conflicts with other transactions are still detected.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 1:
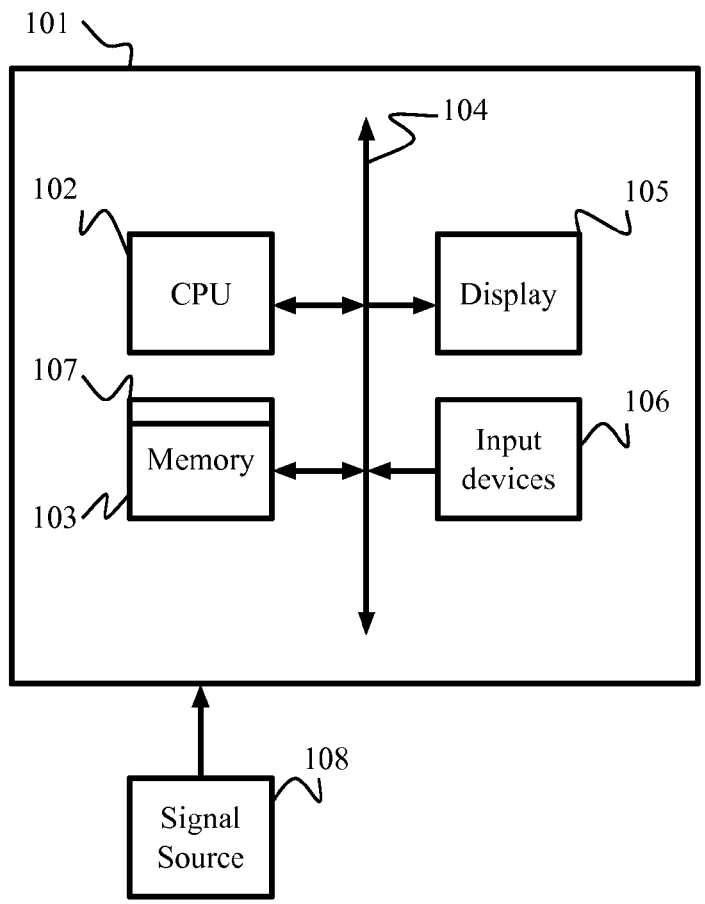
FIG. 1 is a diagram of a system according to an embodiment of the present disclosure.

Referring to FIG. 1, according to an embodiment of the present invention, a computer system 101 implementing BLT can comprise, inter alia, a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, or a combination thereof. The present invention can be implemented as a routine 107 that is stored in memory 103 and executed by the CPU 102 to process the signal from the signal source 108. As such, the computer system 101 is a general-purpose computer system that becomes a specific-purpose computer system when executing the routine 107 of the present invention.

The computer platform 101 also includes an operating system and micro instruction code. The various processes and functions described herein may either be part of the micro instruction code, or part of the application program (or a combination thereof) which is executed via the operating system. In addition, various other peripheral devices may be connected to the computer platform such as an additional data storage device and a printing device.

It is to be further understood that, because some of the constituent system components and methods depicted in the accompanying figures may be implemented in software, the actual connections between the system components (or the processes) may differ depending upon the manner in which the present invention is programmed. Given the teachings of the present invention provided herein, one of ordinary skill in the related art will be able to contemplate these and similar implementations or configurations of the present invention.

Having described embodiments for a system and method for supporting BLTs, it is noted that modifications and variations can be made by persons skilled in the art in light of the above teachings. It is therefore to be understood that changes may be made in the particular embodiments of the invention disclosed which are within the scope and spirit of the disclosure.

What is claimed is:

1. A computer readable medium embodying instructions executable by a processor to perform a method for executing an atomic transaction, the method steps comprising:
    receiving the atomic transaction at a processor for execution;
    determining a transactional memory location needed in memory for the atomic transaction;
    reserving the transactional memory location while all computation and store operations of the atomic transaction are deferred; and
    performing the computation and store operations, wherein the atomic transaction cannot be aborted after the reservation, and further wherein the store operation is directly committed to the memory without being buffered,
    wherein the reservation is progressively released with respect to at least one other reservation of the atomic transaction before completion of the atomic transaction.

2. The method of claim 1, further comprising:
  detecting, for a subsequent atomic transaction, a conflict with the atomic transaction prior to a reservation by the subsequent atomic transaction of the transactional memory location; and
  aborting the subsequent atomic transaction upon detecting the conflict and prior to the reservation by the subsequent atomic transaction.

3. The method of claim 2, wherein the transactional memory location maintains a last value stored before the subsequent atomic transaction started wherein the subsequent atomic transaction is aborted.

4. The method of claim 1, further comprising recording addresses of the transactional memory locations to a Bloom filter structure.

5. The method of claim 4, further comprising:
  issuing a reservation-snoop request to at least one other snooping-processor, wherein the snooping processor checks a local address reservation table to determine if the address in the reservation-snoop request is reserved, wherein an abort signal is returned to the processor issuing the reservation-snoop request upon determining that the address is reserved by the snooping processor.

6. The method of claim 5, wherein the processor issuing the snoop request aborts the atomic transaction upon determining that the requested address is reserved by another processor.

7. The method of claim 1, wherein the processor operates in a first mode for reserving the transactional memory location and operates in a second mode for performing the computation and store operations.

8. The method of claim 7, wherein the processor executes the atomic transaction from transaction start to transaction end for each of the first mode and second mode, wherein the first mode does not create speculative data.

9. A computer readable medium embodying instructions executable by a processor to perform a method for executing an atomic transaction, the method steps comprising:
  receiving the atomic transaction at a processor for execution;
  determining a transactional memory location needed in memory for the atomic transaction;
  acquiring reservations for the transactional memory location to be accessed by at least one of a memory read operation and a memory store operation while deferring all memory store operations until after the reservations of all transactional memory locations; and
  performing a computation operation and the memory store operation, wherein the atomic transaction cannot be aborted after a first store on the transactional memory locations, and further wherein the store operation is directly committed to the memory without being buffered,
  wherein the reservation is progressively released with respect to at least one other reservation of the atomic transaction before completion of the atomic transaction.

10. The method of claim 9, further comprising:
  determining a reservation miss; and
  restarting the atomic transaction.

11. The method of claim 9, wherein the processor operates in a first mode for acquiring the reservation for the transactional memory location and operates in a second mode for performing the computation and store operations, wherein the first mode does not create speculative data.

12. The method of claim 11, wherein the first mode and the second mode overlap.

13. The method of claim 12, wherein no store operation is performed in the first mode.

14. The method of claim 11, wherein the processor executes the atomic transaction from a transaction start to a transaction end for each of the fist mode and second mode.

15. A system for executing an atomic transaction comprising:
  a memory device storing the atomic transaction; and
  a processor for executing the atomic transaction, the execution comprising:
    receiving the atomic transaction at the processor for execution;
    determining a transactional memory location needed in the memory device for the atomic transaction;
    reserving the transactional memory location while all computation and store operations of the atomic transaction are deferred; and
    performing the computation and store operations, wherein the atomic transaction cannot be aborted after the reservation, and further wherein the store operation is directly committed to the memory device without being buffered,
    wherein the reservation is progressively released with respect to at least one other reservation of the atomic transaction before completion of the atomic transaction.

16. The system of claim 15, further comprising a Memory Access History Table (MAHT) stored in the memory device for recording a data address of each memory access in a head phase of the transaction, wherein the system supports an early release optimization using the MAHT, the MAHT mapping the data addresses to a perform to a program counter.

17. The system of claim 15, further comprising a plurality of address reservation tables (ART) recording a physical address reserved in the memory device by a given transaction, wherein the ARTs are implemented as Bloom filter structures in the memory device.

18. A method for executing an atomic transaction, the method steps comprising:
  receiving the atomic transaction at a processor for execution;
  determining a transactional memory location needed in a transaction memory device for the atomic transaction;
  reserving the transactional memory location while all computation and store operations of the atomic transaction are deferred; and
  performing the computation and store operations, wherein the atomic transaction cannot be aborted after the reservation, and further wherein the store operation is directly committed to the memory,
  wherein the reservation is progressively released with respect to at least one other reservation of the atomic transaction before completion of the atomic transaction.

19. The method of claim 18, further comprising:
  detecting, for a subsequent atomic transaction, a conflict with the atomic transaction prior to another reservation of the transactional memory location; and
  aborting the subsequent atomic transactional upon detecting the conflict and prior to a reservation by the subsequent atomic transaction, wherein the transactional memory location maintains a last value stored before the subsequent atomic transaction started wherein the subsequent atomic transaction is aborted.

* * * * *